(12) United States Patent
McCarthy, Jr. et al.

(10) Patent No.: US 11,300,015 B2
(45) Date of Patent: Apr. 12, 2022

(54) TYPE II VALVETRAINS TO ENABLE VARIABLE VALVE ACTUATION

(71) Applicant: Eaton Intelligent Power Limited, Dublin (IE)

(72) Inventors: James E. McCarthy, Jr., Kalamazoo, MI (US); Mihai Dorobantu, Richland, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/260,004

(22) PCT Filed: Jul. 12, 2019

(86) PCT No.: PCT/EP2019/025233
§ 371 (c)(1),
(2) Date: Jan. 13, 2021

(87) PCT Pub. No.: WO2020/011400
PCT Pub. Date: Jan. 16, 2020

(65) Prior Publication Data
US 2021/0324770 A1 Oct. 21, 2021

Related U.S. Application Data

(60) Provisional application No. 62/697,892, filed on Jul. 13, 2018.

(51) Int. Cl.
*F01L 1/26* (2006.01)
*F01L 1/053* (2006.01)
(Continued)

(52) U.S. Cl.
CPC ............... *F01L 1/267* (2013.01); *F01L 1/053* (2013.01); *F01L 1/185* (2013.01); *F01L 1/2405* (2013.01);
(Continued)

(58) Field of Classification Search
CPC ..... F01L 1/053; F01L 1/185; F01L 2001/186; F01L 1/2405; F01L 1/2411; F01L 1/267;
(Continued)

(56) References Cited

U.S. PATENT DOCUMENTS 4,572,114 A 2/1986 Sickler
5,809,952 A 9/1998 Ono et al.
(Continued)

FOREIGN PATENT DOCUMENTS

CN 107060942 A 8/2017
DE 102015209778 A1 12/2016
(Continued)

OTHER PUBLICATIONS

International Search Report and Written Opinion for PCT/EP2019/025233; dated Sep. 18, 2019 pp. 1-13.

*Primary Examiner* — Jorge L Leon, Jr.
(74) *Attorney, Agent, or Firm* — Mei & Mark, LLP

(57) ABSTRACT

A valvetrain for a type II engine comprises a valve bridge, a switching rocker arm, a center capsule, a first auxiliary rocker arm, and a first auxiliary capsule. The selectively switching rocker arm is configured to switch configurations to transfer a first valve actuation profile from a first overhead cam lobe to the valve bridge center point and to transfer a second valve actuation profile from a second overhead cam lobe to the center point. The center capsule is configured to switch between an active state and a lost motion state. The first auxiliary rocker arm is configured to transfer a first auxiliary valve actuation profile from a third overhead cam lobe to the valve bridge first valve mounting area. The valvetrain can further comprise a second auxiliary rocker arm and a second auxiliary capsule.

14 Claims, 15 Drawing Sheets

(51) Int. Cl.
   *F01L 13/00*   (2006.01)
   *F01L 13/06*   (2006.01)
   *F02D 13/04*   (2006.01)
   *F02D 13/06*   (2006.01)
   *F01L 1/18*    (2006.01)
   *F01L 1/24*    (2006.01)
   *F02D 13/02*   (2006.01)

(52) U.S. Cl.
   CPC ......... *F01L 1/2411* (2013.01); *F01L 13/0005* (2013.01); *F01L 13/06* (2013.01); *F02D 13/0207* (2013.01); *F02D 13/0257* (2013.01); *F02D 13/04* (2013.01); *F02D 13/06* (2013.01); *F01L 2001/186* (2013.01); *F01L 2013/001* (2013.01)

(58) Field of Classification Search
   CPC . F01L 13/0005; F01L 2013/001; F01L 13/06; F02D 13/0207; F02D 13/0257; F02D 13/04; F02D 13/06
   USPC .......... 123/90.16, 90.27, 90.4, 90.41, 90.43, 123/90.44, 198 F
   See application file for complete search history.

(56) References Cited

U.S. PATENT DOCUMENTS

| | | | |
|---|---|---|---|
| 7,225,776 | B2 | 6/2007 | Gecim et al. |
| 9,494,061 | B2 | 11/2016 | Hatamura et al. |
| D839,310 | S | 1/2019 | Alessandria |
| 10,260,386 | B2 | 4/2019 | Andrisani et al. |
| 2006/0102119 | A1 | 5/2006 | Gecim et al. |
| 2017/0276034 | A1 | 9/2017 | Cecur et al. |
| 2018/0058271 | A1* | 3/2018 | Baltrucki ................ F01L 13/06 |
| 2019/0010835 | A1 | 1/2019 | McCarthy, Jr. et al. |
| 2019/0040769 | A1 | 2/2019 | Nielsen et al. |
| 2019/0055861 | A1* | 2/2019 | Persson .................. F01L 1/181 |
| 2019/0107011 | A1 | 4/2019 | Contarin et al. |
| 2019/0145287 | A1 | 5/2019 | Kameda et al. |
| 2019/0178113 | A1 | 6/2019 | McCarthy, Jr. et al. |
| 2019/0360362 | A1* | 11/2019 | Cecil ...................... F01L 1/181 |

FOREIGN PATENT DOCUMENTS

| | | |
|---|---|---|
| DE | 102015218669 A1 | 3/2017 |
| EP | 0167267 A1 | 1/1986 |
| WO | WO-2017/177102 A1 | 10/2017 |
| WO | WO-2018/068041 A1 | 4/2018 |
| WO | WO-2019/036272 A1 | 2/2019 |
| WO | WO-2019/040733 A1 | 2/2019 |

* cited by examiner

TYPE II VALVETRAINS TO ENABLE VARIABLE VALVE ACTUATION

This is a § 371 National Stage Entry of Patent Cooperation Treaty Application No. PCT/EP2019/025233, filed Jul. 12, 2019 which claims the benefit of U.S. provisional application No. 62/697,892, filed Jul. 13, 2018, all of which are incorporated herein by reference.

FIELD

This application provides hardware for enabling variable valve actuation ("VVA") techniques on one or two valves of a cylinder. The VVA techniques can comprise one or a combination of cylinder deactivation, hydraulic lash adjustment and engine braking. Additional functions such as late intake valve closing, early exhaust valve opening and internal exhaust gas recirculation or reverse intake can be combined also.

BACKGROUND

Type II, end pivot, type engines comprise an overhead rotating cam to actuate a rocker arm. The prior art lacks options to provision more than one variable valve actuation technique on a cylinder of an engine.

Prior art valve bridges can be as shown in U.S. D839,310, WO 2019/040733, WO 2019/036272 or US 2017/0276034. The valve bridge can transfer a first valve lift profile to both valves on the valve bridge. A movable cleat that passes through the valve bridge can permit an additional VVA valve lift profile to be applied to one of the valves.

SUMMARY

It is desired to expand the valve bridge concept to a type II valvetrain so that a first valve lift profile can be applied to both valves of the valve bridge and a VVA valve lift profile can be selectively applied to a first valve. Additionally, a second VVA valve lift profile can be selectively applied to the second valve. When applying all options disclosed herein, a pair of valves connected to the valvetrain can selectively offer more than one VVA valve lift profile such as cylinder deactivation ("CDA") and engine braking ("EB") with hydraulic lash adjustment ("HLA") to both valves. Additional functions such as late intake valve closing ("LIVC"), early exhaust valve opening ("EEVO") and internal exhaust gas recirculation ("iEGR") or reverse intake ("RI") can be combined with the CDA, HLA, & EB functionality.

The systems and methods disclosed herein overcome the above disadvantages and improves the art by way of a valvetrain for a type II engine comprising a valve bridge, a switching rocker arm, a center capsule, first auxiliary rocker arm, and first auxiliary capsule. The valve bridge comprises a center point, a first valve mounting area, and a second valve mounting area. The valve bridge is configured to transfer force from the center point to the first valve mounting area and to the second valve mounting area. The selectively switching rocker arm is configured to transfer a first valve actuation profile from a first overhead cam lobe to the center point when the switching rocker arm is selected to switch to a first configuration and is configured to transfer a second valve actuation profile from a second overhead cam lobe to the center point when the switching rocker arm is selected to switch to a second configuration. The switching rocker arm comprises a valve end and a pivot end. The center capsule is connected to either the valve end or to the pivot end. The center capsule is configured to switch between an active state and a lost motion state. The active state is configured to transfer the selected first valve actuation profile or the selected second valve actuation profile, and the lost motion state is configured to absorb the selected first valve actuation profile or the selected second valve actuation profile. The first auxiliary rocker arm is configured to transfer a first auxiliary valve actuation profile from a third overhead cam lobe to the first valve mounting area. The first auxiliary rocker arm comprises a first auxiliary valve end and a first auxiliary pivot end. The first auxiliary capsule is connected to either the first auxiliary valve end or the second auxiliary pivot end. The first auxiliary capsule is configured to switch between a first auxiliary active state and a first auxiliary lost motion state. The first auxiliary active state is configured to transfer the first auxiliary valve actuation profile and the first auxiliary lost motion state is configured to absorb the first auxiliary valve actuation profile.

The valvetrain can further comprise a second auxiliary rocker arm and a second auxiliary capsule. The second auxiliary rocker arm is configured to transfer a second auxiliary valve actuation profile from a fourth overhead cam lobe to the second valve mounting area. The second auxiliary rocker arm comprises a second auxiliary valve end and a second auxiliary pivot end. The second auxiliary capsule is connected to either the second auxiliary valve end or the second auxiliary pivot end. The second auxiliary capsule is configured to switch between a second auxiliary active state and a second auxiliary lost motion state. The second auxiliary active state is configured to transfer the second auxiliary valve actuation profile and the second auxiliary lost motion state is configured to absorb the second auxiliary valve actuation profile.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures. For example, a left hand rocker arm and a right hand rocker arm are shown flanking a center rocker arm in FIG. 9. And, a "first" auxiliary rocker arm and a "first" auxiliary capsule are claimed to comply with antecedence requirements. But when implementing the claims in practice, the invention is not limited to "left hand" and "right hand," as disclosed. The "first" and "second" instances of rocker arms and capsules can be implemented as either "left hand" or "right hand."

It is desired to provide flexibility in the variable valve actuation techniques that can be implemented in a type II engine. Engines are becoming smaller, which reduces the number of cylinders available, yet more functionality is demanded. So, it is beneficial to provide a lot of functionality on the fewer cylinders to meet customer size and weight requirements for the engine. However, adding more functionality adds parts. As shown and described, the functionality desired by customers can be achieved reliably and within the footprint of the engine.

Figure 1A:
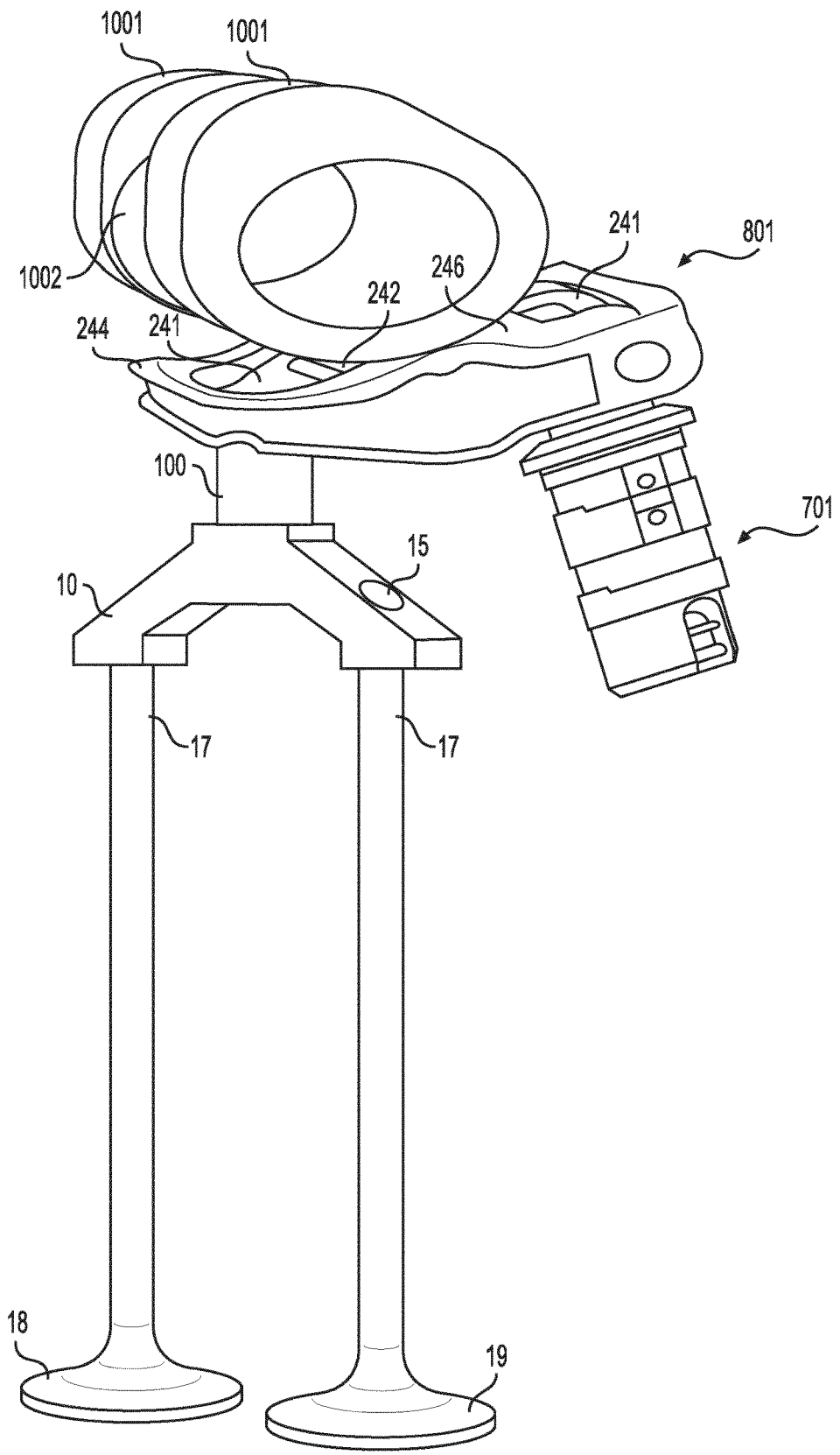
FIGS. 1A-1D are examples of switching rocker arms.

Turning to the Figures, valvetrains for a type II engine will be explained. In FIG. 1A, a first portion of the valvetrain comprises a valve bridge 10, a switching rocker arm 801, and a center capsule 100. The first portion of the valvetrain can comprise both the capsule 100 and the deactivating lash adjuster 701, or only the deactivating lash adjuster 701. Or, the deactivating portion of the lash adjuster can be omitted to provide a hydraulic or manual lash adjusting capsule 702 and the capsule 100 can comprise one of the alternative capsules as described. Capsule can comprise deactivating capsule 101 or added motion capsule 102. Alternative capsules 100 can comprise castellation devices such as shown in WO 2019/036272 among other alternatives, hydraulic devices such as shown in US 2019/0178113 among other alternatives, or other devices such as magnetic, electromechanical, hydraulic, or piezoelectric switching capsules. The alternatives for capsule 100 can constitute the center capsule and first and second auxiliary capsules, as claimed.

The center capsule can be connected to the valve end and the pivot end of the switching rocker arm can comprise a hydraulic lash adjuster. When the center capsule comprises the lash adjuster, both valves 18, 19 can receive lash adjustment functionality. Or, the lash adjustment can be provided individually to the respective valves 18, 19. So, the first auxiliary capsule can comprise a first auxiliary hydraulic lash adjuster. The first auxiliary capsule can be connected to the first auxiliary valve end and the first auxiliary pivot end can comprise a first auxiliary hydraulic lash adjuster. The second auxiliary capsule can comprise a second auxiliary hydraulic lash adjuster. The second auxiliary capsule can be connected to the second auxiliary valve end and the second auxiliary pivot end can comprise a second auxiliary hydraulic lash adjuster.

The center or auxiliary capsules can comprise a lash adjuster in the capsule 100 connected on the valve end 253, 12. Or, the lash adjuster can be connected to the pivot end 254, 11. When the lash adjuster is connected on the valve end 253, 12, a hydraulic circuit can be formed through a pivot device 703 connected to the pivot end 254, 11. Fluid transfer through the rocker arm to the valve end can be arranged to actuate one or both of a hydraulic lash adjuster and an added motion or deactivating latch or other hydraulic device configured to switch between an active state and a lost motion state.

The center capsule can be configured to switch between an active state and a lost motion state. The functionality can be included in one of the pivot-side devices (deactivating lash adjuster 701, manual lash adjusting capsule 702, or pivot device 703) or in one of the capsules 100 on the valve bridge 10. The active state is configured to transfer a selected first valve actuation profile or a selected second valve actuation profile, and the lost motion state is configured to absorb the selected first valve actuation profile or the selected second valve actuation profile. The motion of both valves can be deactivated thereby for a VVA function such as cylinder deactivation ("CDA") or dynamic cylinder activation ("DCA"), among others. The center capsule can be configured to provide in the lost motion state a cylinder deactivation function so as to eliminate motion of the valve bridge. Valve reset can also be enabled thereby.

The valve bridge 10 can comprises a center point 13, a first valve mounting area 14, and a second valve mounting area 15. The valve bridge 10 is configured to transfer force from the center point 13 to the first valve mounting area and to the second valve mounting area. The first valve mounting area 14 can comprise a pass-through such as a hole to pass motion through the valve bridge, so too the second valve mounting area 15 can comprise a hole as a pass-through. An arrangement such as shown in U.S. D839,310 can permit the mounting of a valve stem 16, 17 to a cleat. The cleat can be acted on by one of the capsules 100 or by another connection between the valve end 12, 253 and the cleat. The valve so connected can receive a particular VVA function such as engine braking, reverse intake actuation, internal exhaust gas recirculation, among others, while the other valve does not receive the same VVA function. Yet, when the center point 13 is acted on, the valve bridge 10 can transfer forces to both valves 18, 19 connected to the valve bridge 10.

The selectively switching rocker arm 801 or 802 is configured to transfer a first valve actuation profile from a first overhead cam lobe, which can be a pair of overhead cam lobes 1001, to the center point 13 when the switching rocker arm is selected to switch to a first configuration and is configured to transfer a second valve actuation profile from a second overhead cam lobe 1002 to the center point 13 when the switching rocker arm is selected to switch to a second configuration. The dimensions of the cam lobes 1001-1005 can be varied as needed to impart the attributes of the desired valve actuation profile.

The switching rocker arm 801, 802 comprises a valve end and a pivot end. The valve end couples directly or indirectly to the valve bridge 10. The pivot end connects so as to pivot on a block 2000, which can comprise the engine block, a tower, or other mounting piece for the valvetrain. A center capsule can be connected to either or both of the valve end or to the pivot end.

The switching rocker arm 801 of FIG. 1A comprises an inner arm 241 and an outer arm 244. According to the example, the overhead cam lobes 1001 can impart a valve actuation profile to slider pads 246 on the outer arm 244. Switching the configuration of a latching mechanism within the rocker arm 801 permits overhead cam lobe 1002 to impart a second valve actuation profile to a roller 242 on inner arm 241. In one configuration, the inner arm can pivot relative to the outer arm 244, and in the other configuration, the inner arm 241 cannot so pivot. This impacts the transfer of forces to the valve bridge to impart the valve actuation profiles.

Figure 1B:
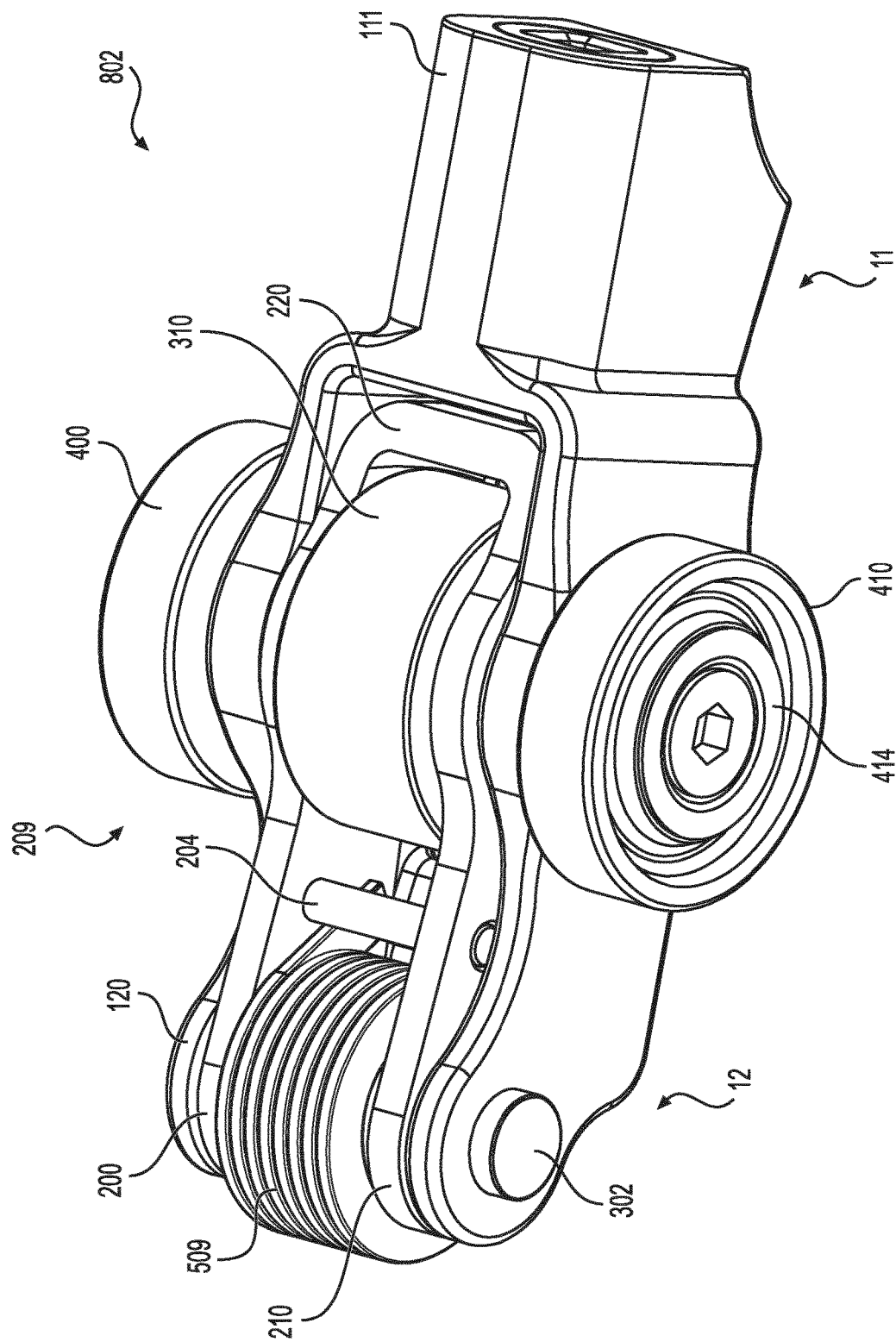
Figure 1C:
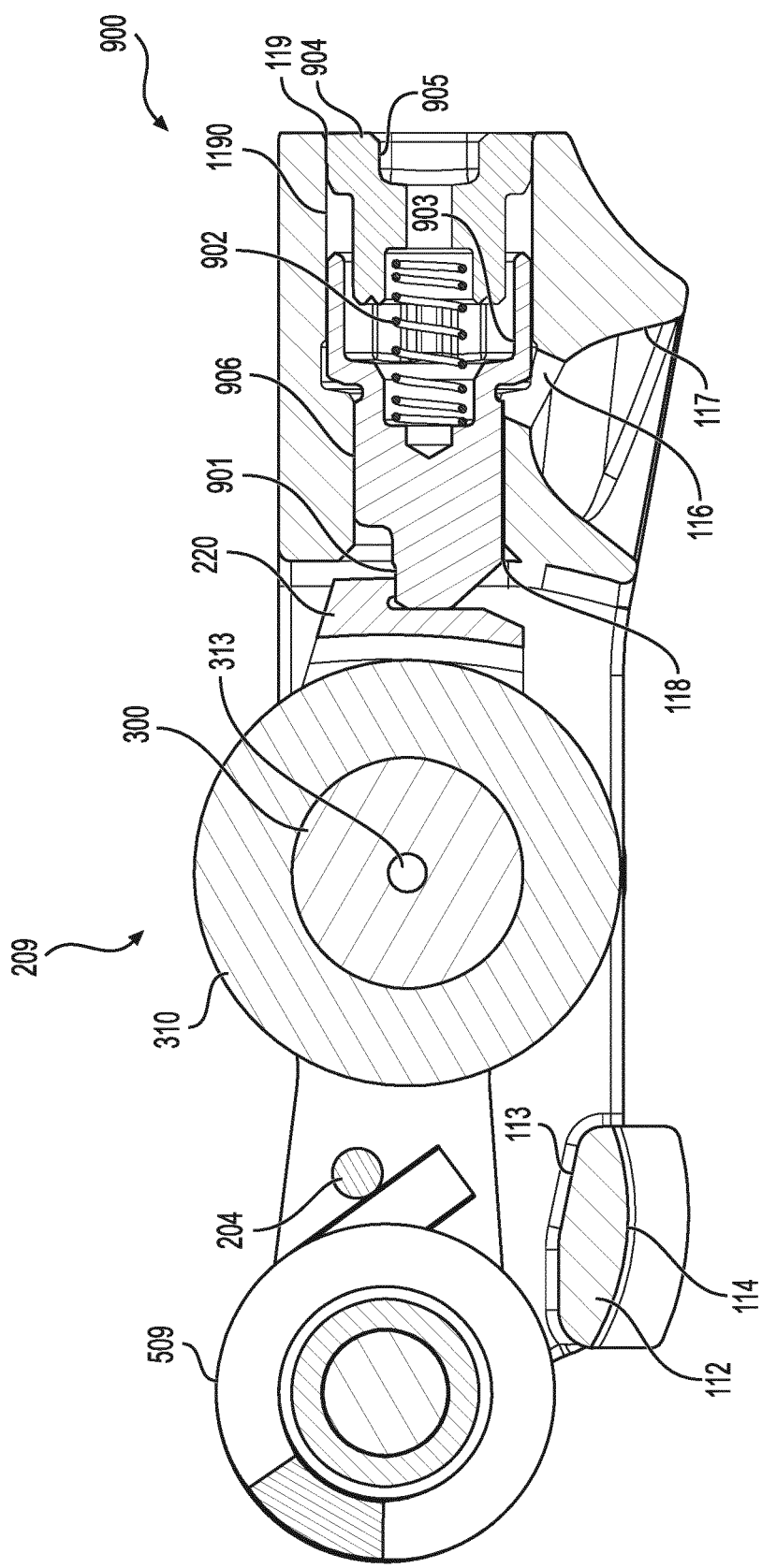
Figure 1D:
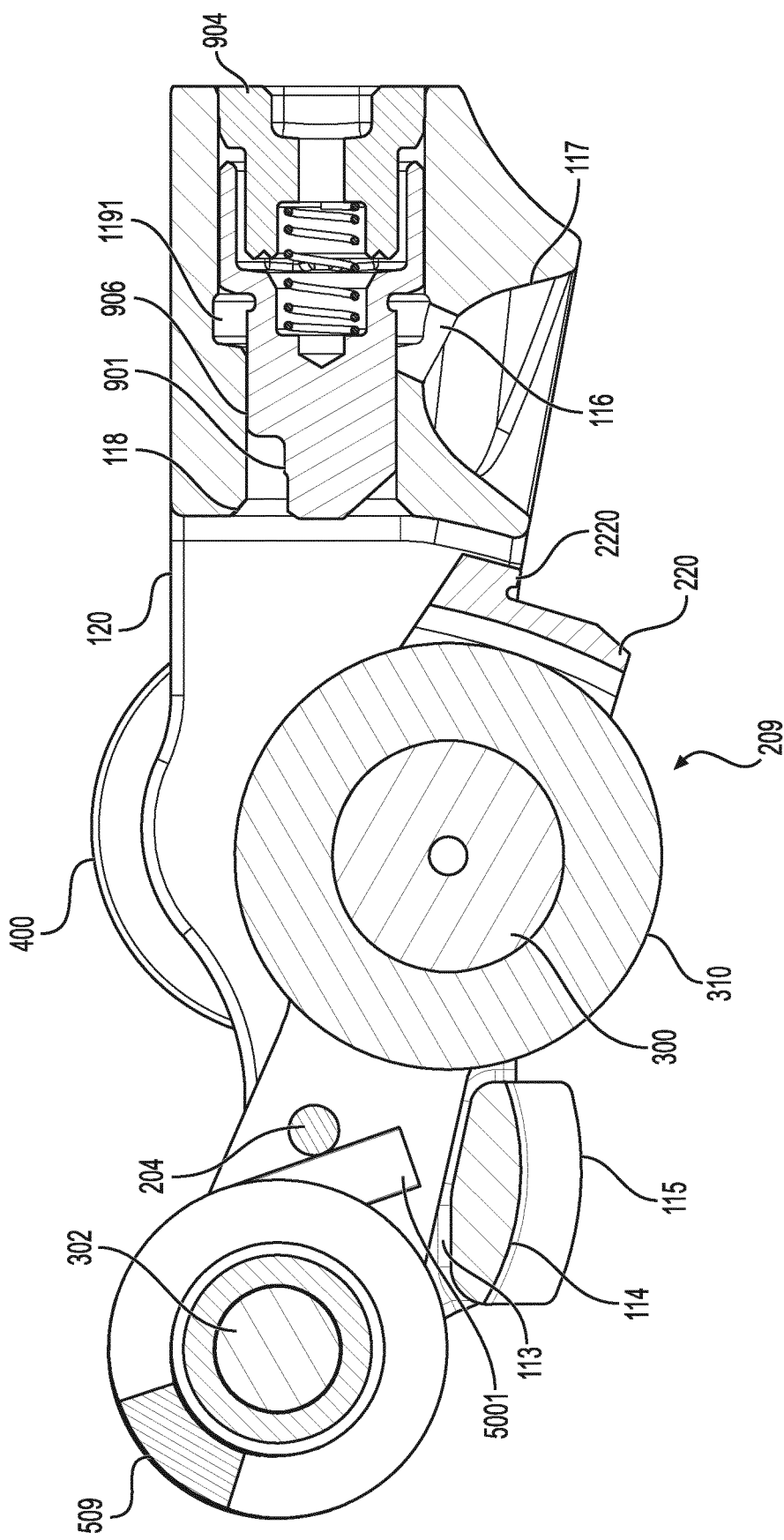

FIG. 1B-1D show another switching rocker arm 802, also called a switching roller finger follower ("SRFF"), with the configuration of an exemplary latching mechanism 900 and the pivoting of the inner arm assembly and the outer arm assembly. When unlatched, as in FIG. 1D, an inner arm assembly 209 can move independently of the outer arms 120. The inner arm assembly 209 can comprise inner arms 200, 210, latch arm 220, and an inner roller 310.

A lost motion spring 509 can be around a pivot axle 302 over the valve end 12. A capsule 100 can be connected to or abutted to second side 114 of pallet 112. The lost motion spring 509 can be biased in several ways, but is shown with a first end 5001 biased against a spring prop in the form of an inner bar 204. A second end of the lost motion spring 509 can be biased against first side 113 of pallet 112. On the pivot end 11, a hydraulic or manual lash adjuster (deactivating lash adjuster 701 or manual lash adjusting capsule 702) or pivot device 703 can be mounted in a ball-and-socket type arrangement in a seat 117 to cooperate with a hydraulic port 116.

The latching mechanism 900 is in a latched position in FIGS. 1B & 1C. The center spring biases the inner arm assembly 209 so that inner roller 310 is lifted towards the overhead cam lobe 1002 when the SRFF is installed in a valve train. This can also mean that the latch arm 220 is biased to a position above a surface of latching mechanism 900, such as above latch seat 901. So, the latch ledge 2220 of the inner arm 200 can be in contact with the latch seat 901 when the inner arm assembly 209 is pressed from above, or the latch arm 220 can be biased to a position slightly above the latch seat 901. In FIG. 1D, the latching mechanism 900 is in an unlatched position and latch arm 220 has rotated past the latch to "lose" the motion of the center cam lobe 1002 on the inner arm assembly 209. Outer cam lobes 1001, 1001 can roll on the outer first and second rollers 400, 410. Rollers can be secured to cantilevered posts by fasteners 414.

The latching mechanism 900 can be actuated by hydraulics, and thus be connected to oil control valves and an oil control circuit. Or, electric or electromechanical mechanisms can reciprocate a latching mechanism 900. The latching mechanism 900 can be biased to operate in a default position or require affirmative control for each of the first or second configurations (extended or withdrawn positions). A hydraulic latch is shown for the latching mechanism 900. A latch finger 906 can reciprocate so that a latch seat 901 can extend from and retract into an inner latch port 118 in the pivot body 111 of the SRFF. The latch finger 906 can fluidly communicate with hydraulic port 116 so that fluid can be fed through the HLA (deactivating lash adjuster 701) or pivot device 703 or through a latch fluid port 905, or a fluid circuit can be established therethrough. Latch port 118 is stepped, as is the latch finger 906 so that a shoulder can fill a portion 1190 of latch cavity 119 when the latch finger 906 is extended, and the shoulder can fill another 1191 of latch cavity 119 when latch finger 906 is retracted. Latch plug 904 can seat in cavity 903 and receive and bias a latch spring 902 that can bias the latch finger 906 to the extended position. As above, other latch mechanisms can be substituted for the hydraulic latch illustrated without departing from the SRFF operation principles described herein.

The inner roller 310 can be a unitary material, or it can comprise a separate bearing axle or second axle 300 fixed across the inner arms 200, 210 and an outer material, as illustrated. In some embodiments, the bearing axle 300 can be surrounded by bearings. A hollow passageway 313 can be formed within the inner roller 310.

FIG. 1D illustrates the SRFF in an unlatched condition. The latch finger 906 is in a retracted position, and a shoulder of the latch finger is withdrawn to permit fluid in the portion 1191 of the stepped inner latch port 118. As above, the lost motion spring 509 is biased between spring prop inner bar 204 and first side 113 of pallet 112. But, an overhead cam lobe 1001 can overcome the spring force of lost motion spring 509. Latch arm 220 can swing past the latching mechanism 900 as inner arm assembly 209 pivots on pivot axle 302, but the inner arms 200, 210 cannot swing past pallet 112 because the inner arms 200, 210 can come in contact with the first side.

The switching rocker arms 801, 803 are examples and other switching rocker arms can be substituted for those disclosed therein. Numerous examples can be found in WO 2018/068041 incorporated by reference herein. Numerous other substitutions of switching rocker arms and switching roller finger followers can be made within the teachings of the disclosure.

As one working example, a cylinder deactivation function and lash adjustment function can be provided by the center capsule in the form of deactivating lash adjuster 701. Adjusting hydraulic pressure to the deactivating lash adjuster 701 can control switching between a latched state for full transfer of overhead cam lobe profiles and an unlatched state for cylinder deactivation and no valve motion. A first valve actuation profile can comprise a late intake valve closing profile on the outer lobes (transferred to slider pads 246 or rollers 400, 410). Unlatching the inner arm from the outer arm can lose the LIVC motion in favor of a second valve actuation profile, such as a nominal valve actuation profile.

Figure 3:
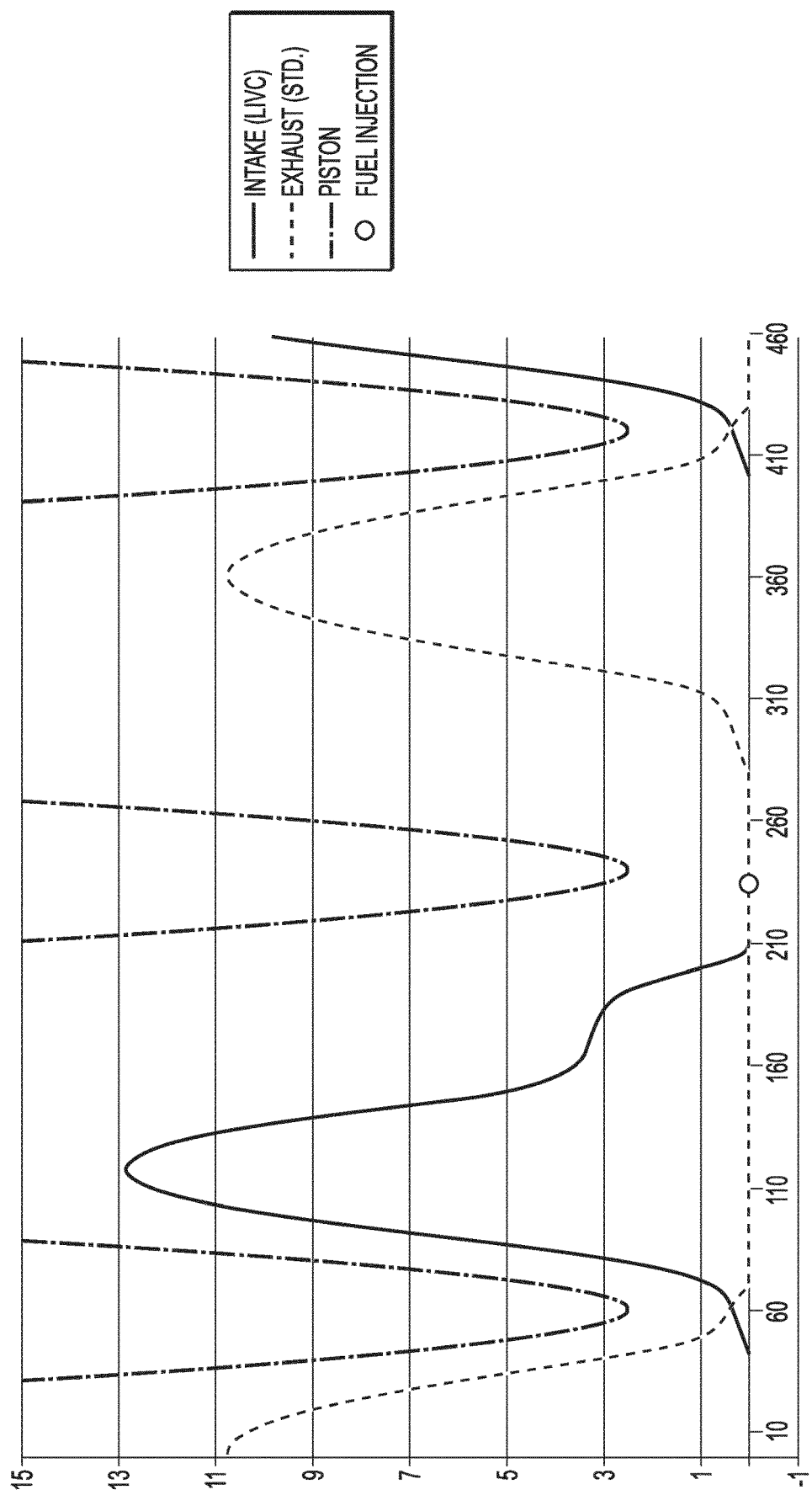

FIG. 3 provides further explanation of the LIVC valve actuation profile. While the example of LIVC is shown, nothing precludes a VVA technique such as an early or late opening or closing event on the exhaust valve or an alternative early opening or closing event or early closing event on the intake valve. The valves 18, 19 are linked to the valve bridge 10 so that normal intake valve lift is applied to the valves when the switching rocker arm is configured with the inner arm unlatched. However, when the switching rocker arm is configured with the inner arm latched, an LIVC lift profile is applied between 160-210 degrees of crankshaft rotation. Switching the capsule to a lost motion state removes all valve motion for a technique such as cylinder deactivation.

Figure 4A:
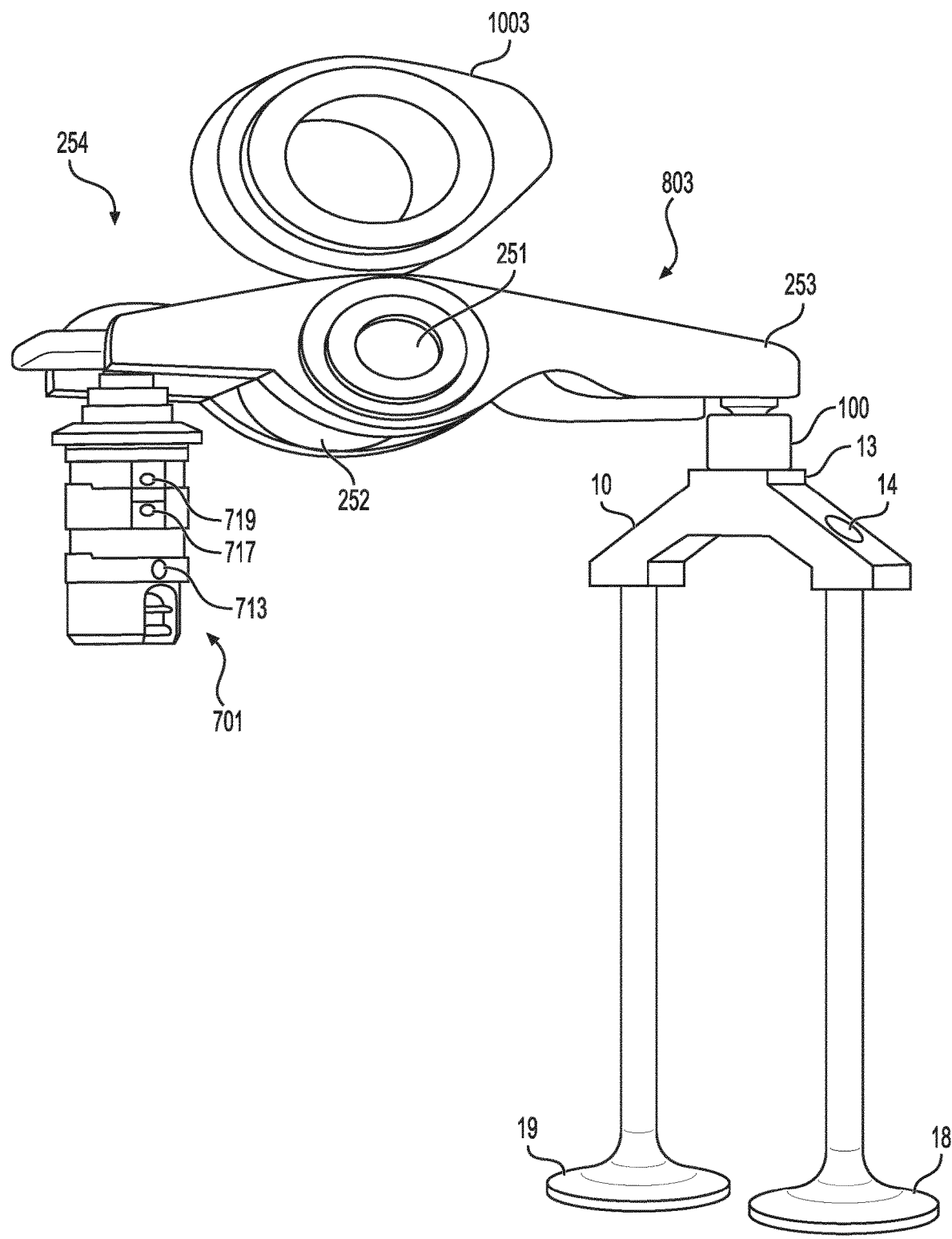
FIG. 4A is an example showing a selectively switching rocker arm configured to transfer a first and a second valve actuation profile to a center point of a valve bridge.

In some configurations, it is possible to substitute a non-switching rocker arm for the center rocker arm. Such is shown in FIG. 4A. A rocker arm 803 comprising a roller 252 on a pivot axle 251 and a pivotable body comprising a valve end 253 and a pivot end 254 receives a valve actuation profile from an overhead cam lobe 1003. If a deactivating lash adjuster 701 is used on the pivot end, it is possible to switch between an active state and a lost motion state and thus provide alternative valvetrain functionality to both valves 18, 19. Providing hydraulic porting through the rocker arm 803 can provide additional or alternative switching between an active state and a lost motion state, providing additional or alternative valvetrain functionality to both valves 18, 19.

As one working example, it is possible to use one capsule, such as the deactivating lash adjuster 701 to switch between a cylinder deactivation valve functionality in the lost motion state and an active valve functionality in the active state. Then, a second capsule 100 can switch between an active state for bleeder braking, holding the valves 18, 19 open slightly to force exhaust past a restricted opening, and a lost motion state where no braking function is provided. Instead of bleeder braking, compression release braking, internal exhaust gas recirculation, or exhaust reinduction can be provided. The functionality of the capsules can be reversed so that capsule 100 and deactivating lash adjuster 701 swap the example functionality.

Figure 4B:
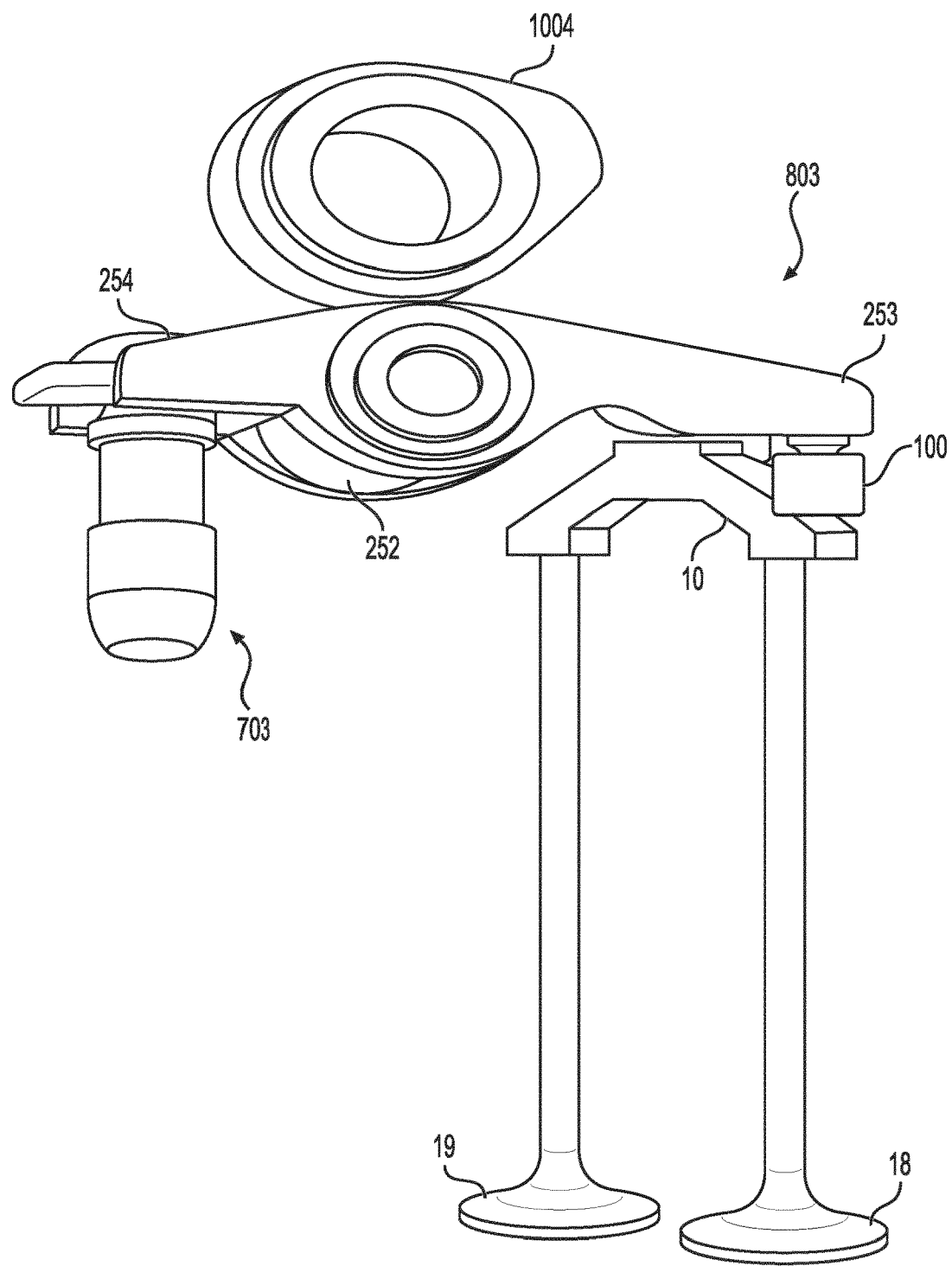
FIG. 4B is an example of an auxiliary rocker arm configured to transfer an auxiliary valve actuation profile to a valve mounting area.

While a lot of VVA functionality is provided via the capsules and switchable or non-switchable rocker arms, it is possible to add even more functionality to the valvetrain. A second portion of the valvetrain can be added, the second portion comprising a first auxiliary rocker arm, and first auxiliary capsule. The aspects of FIGS. 4A & 4B can be combined so that the valve bridge 10 is acted on by two rocker arms 803. In the example of FIG. 4B, a right hand auxiliary rocker arm is added, though nothing precludes use of a left hand auxiliary rocker arm. The first auxiliary rocker arm 803 is configured to transfer a first auxiliary valve actuation profile from a third overhead cam lobe 1004 to the first valve mounting area over valve 18. The first auxiliary rocker arm comprises a first auxiliary valve end 253 and a first auxiliary pivot end 254. A lash adjuster (manual lash adjusting capsule 702) or pivot device 703 is provided.

As one working example, the center rocker arm of FIG. 4A can provide switchable VVA functionality to select between cylinder deactivation and active valve motion, all the while providing lash adjustment via deactivating lash adjuster 701. Then, the second portion of the valvetrain can be configured as a braking rocker arm assembly. Braking can be provided to the right hand valve 18. A simple pivot device 703 can provide fluid feed to the rocker arm 803 and to the capsule 100. Controlling the pressure of the oil fed to the capsule 100 can stiffen the capsule to add motion to the valve 18. Reducing the pressure of the oil fed to the capsule 100 permits lost motion state and no added motion for valve 18. The amount of braking power provided can be controlled by the capsule configuration. With independent control of the right hand (first auxiliary capsule), engine braking can be provided independent of cylinder deactivation and any additional functionality on the left hand valve 19.

The first auxiliary capsule can be connected, as above, to either the first auxiliary valve end or to the first auxiliary pivot end to customize VVA functionality. The first auxiliary capsule can be configured to switch between a first auxiliary active state and a first auxiliary lost motion state. The first auxiliary active state is configured to transfer the first auxiliary valve actuation profile and the first auxiliary lost motion state is configured to absorb the first auxiliary valve actuation profile so that the first auxiliary valve actuation profile is "lost."

Figure 4C:
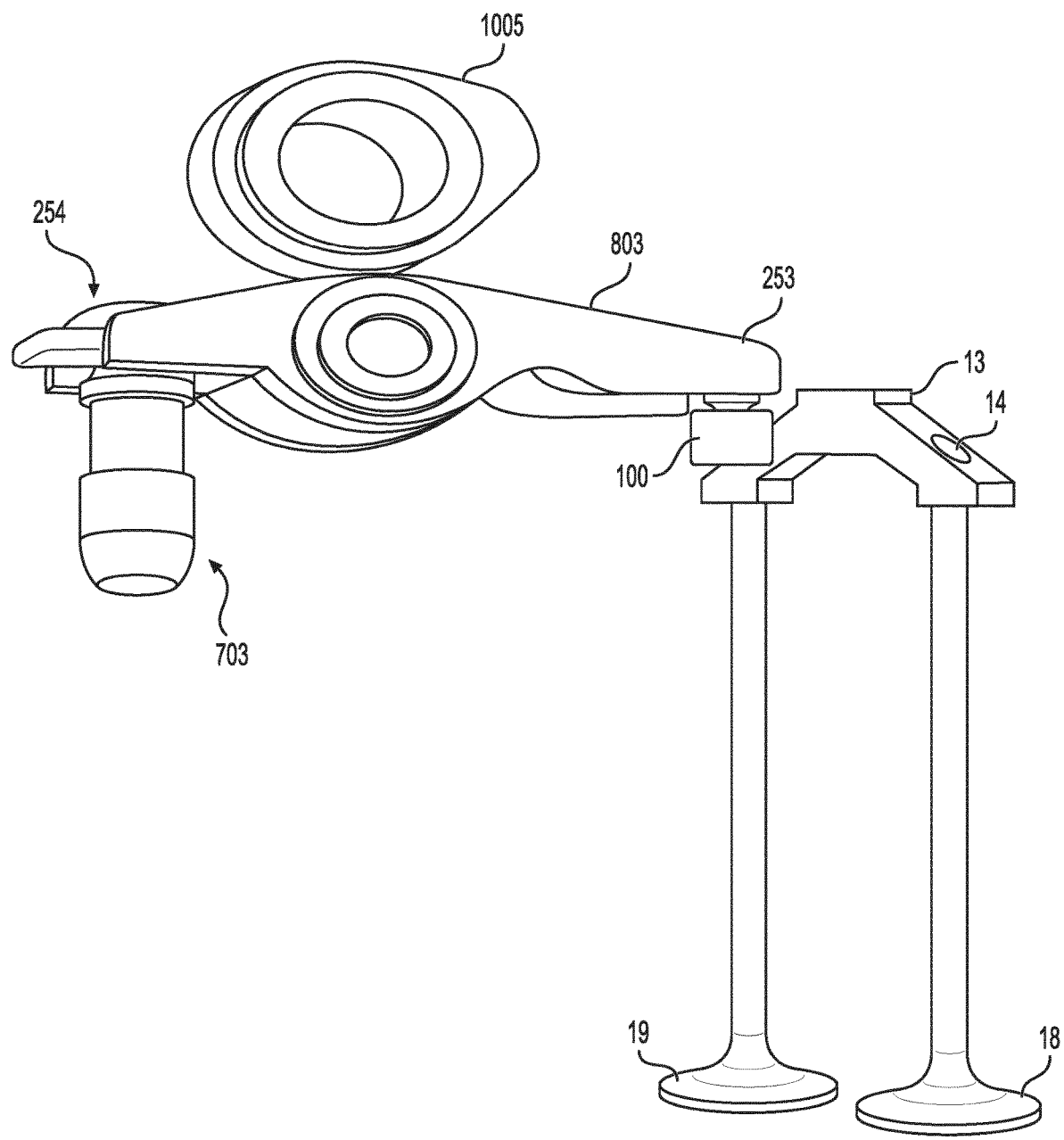
FIG. 4C is an example of another auxiliary rocker arm configured to transfer another auxiliary valve actuation profile to another valve mounting area.

In a further addition of VVA functionality, a third portion of the valvetrain can be added, as shown in FIG. 4C. A combination of aspects of FIGS. 4A, 4B, & 4C is possible. The valvetrain can comprise a second auxiliary rocker arm and a second auxiliary capsule on a left hand side of the valve bridge 10 to add VVA functionality to valve 19. A second auxiliary rocker arm can be configured to transfer a second auxiliary valve actuation profile from a fourth overhead cam lobe 1005 to the second valve mounting area. The second auxiliary rocker arm can comprise a second auxiliary valve end and a second auxiliary pivot end. A second auxiliary capsule can be connected to either the second auxiliary valve end or the second auxiliary pivot end. The second auxiliary capsule can be configured to switch between a second auxiliary active state and a second auxiliary lost motion state. The second auxiliary active state can be configured to transfer the second auxiliary valve actuation profile and the second auxiliary lost motion state can be configured to absorb the second auxiliary valve actuation profile.

Figure 5:
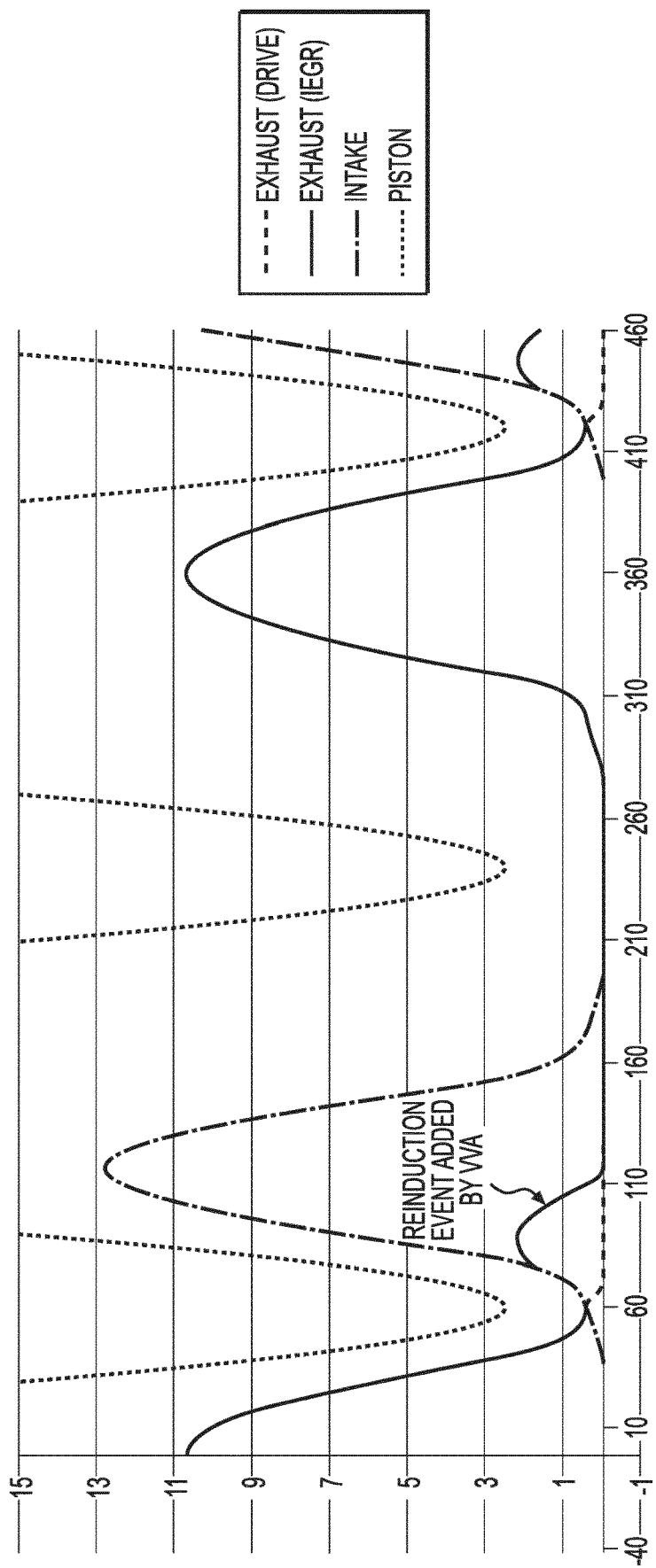

Expanding upon the prior working example, this can permit the addition of an internal exhaust gas recirculation or exhaust reinduction event. Now, the right hand valve 18 can continue to offer independent engine braking or bleeder braking with a custom valve actuation profile, and the left hand valve 19 can have a different valve actuation profile for a wholly different VVA technique. The left hand valve 19 can be configured to actuate as shown in FIG. 5, with independent control from the right hand side. Porting control oil through the rocker arm 803 to the capsule 100 controls the switching between active state and lost motion state. Alternatively, a switchable capsule can be used at the pivot end 254 as by providing a capsule there instead of at the valve end 253.

Independent control of the left hand valve 19 permits it to actuate as shown in FIG. 5 at 60-110 degrees of crankshaft rotation. The left-hand exhaust valve 19 can be opened and closed slightly while the intake valve is opening and closing to provide a reinduction event. The other exhaust valve can follow its nominal drive profile until engine braking is required of it. And, the left hand valve 19 can coincide its motion with the drive profile of the right hand valve 18 because of the valve bridge 10 transferring nominal or drive profile to both valves 18, 19.

Figure 6:
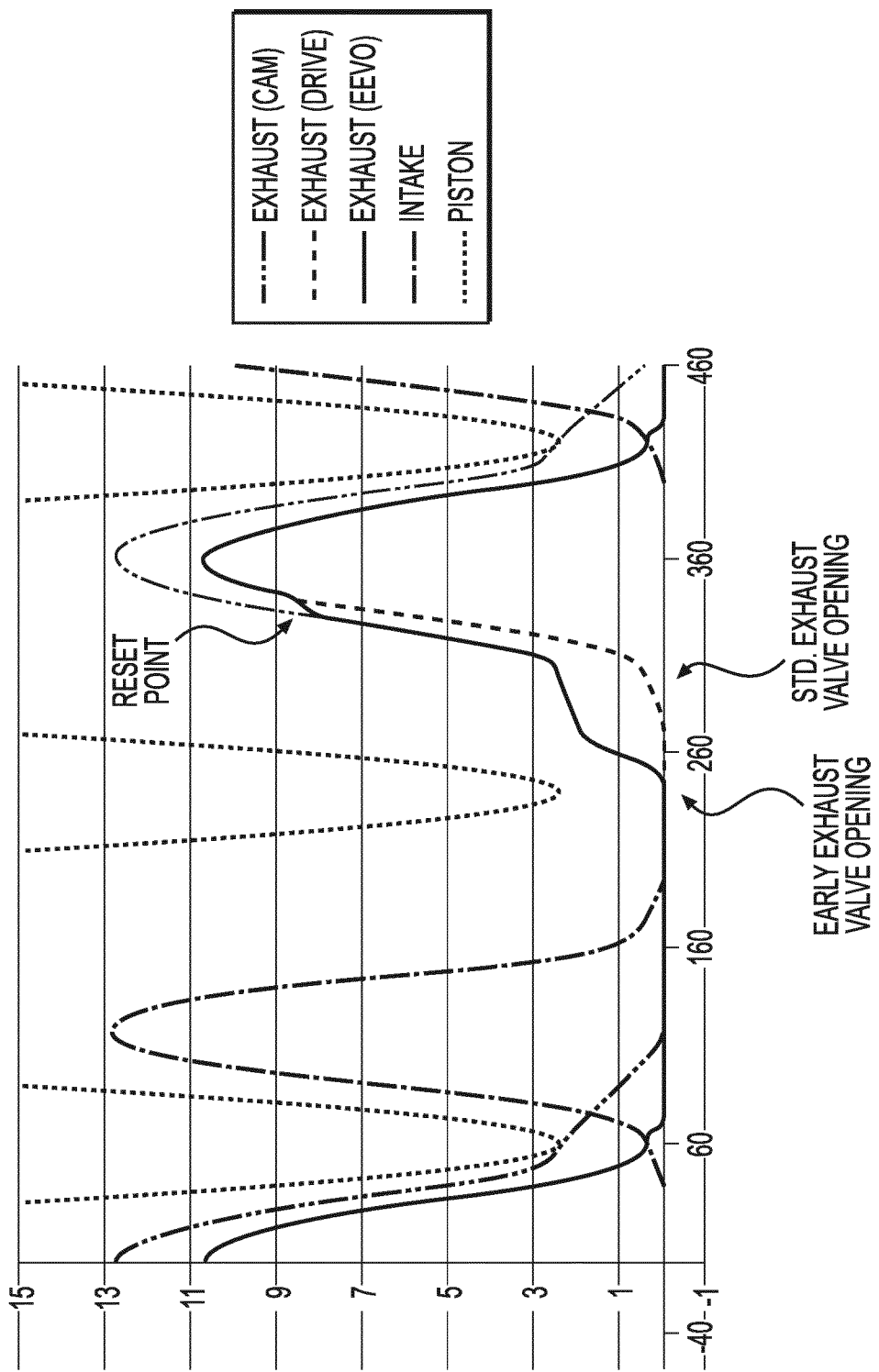

As yet another working example, the valvetrain can comprise the first and second valvetrain portions as described above for FIGS. 4A & 4B on the exhaust valves, but the third valvetrain portion can be configured for early exhaust valve opening ("EEVO"). Then, the valve actuation profiles of FIG. 6 can be accomplished. The fourth overhead cam lobe 1005 can be configured to impart the lift profile shown for EXHAUST (CAM). But, the capsule 100 on the valve bridge 10 or a capsule on the pivot end 254 can be controlled to add an early exhaust valve opening around 260-300 degrees of crankshaft rotation and curtail the exhaust valve motion during exhaust valve lift. In the capsule active state, the exhaust valve 19 follows the fourth overhead cam lobe 1005 profile, but in the lost motion state of the capsule, the exhaust valve 19 experiences a "RESET POINT" where it stops following the profile of the fourth overhead cam lobe 1005. Control for the EEVO can be independent of the CDA and braking functionality described for FIGS. 4A & 4B.

Figure 2:
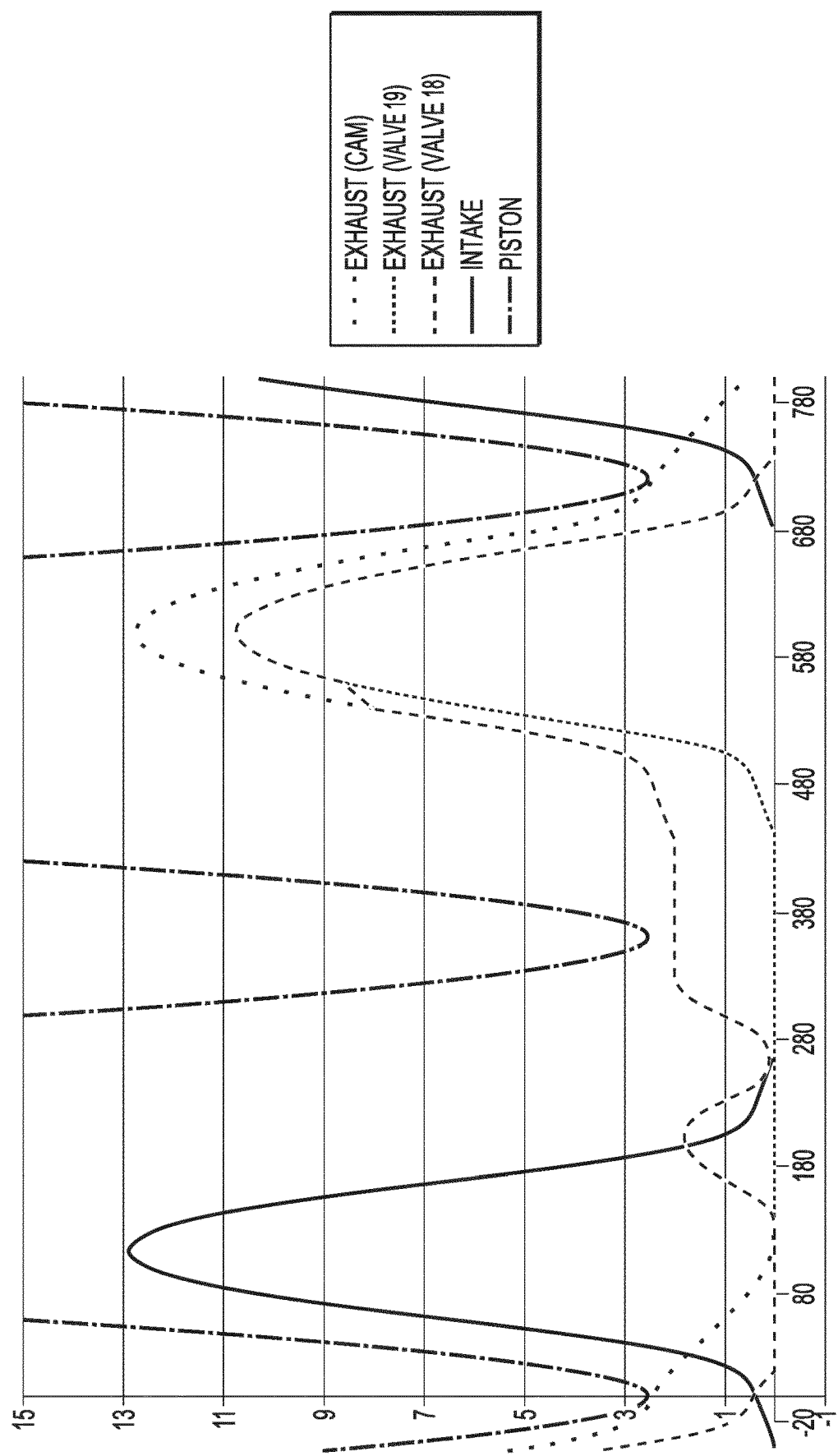
FIGS. 2, 3, 5, & 6 are examples of valve actuation profiles.

An alternative working example combining the first and second valvetrain portions of FIGS. 4A & 4B will be described in reference to FIG. 2. In FIG. 2, an alternative braking technique is shown for the exhaust valve 18. The intake valves can lift and lower according to the normal intake lift profile. No fuel injection is supplied. Multiple braking events can occur resulting in "boosting" the charge in the cylinder and increasing the braking power. A first brake gas recirculation event can be had near the end of the intake valve closing, about 130-270 degrees of crankshaft rotation, as by actuating the capsule a first time. Some compression of the cylinder is permitted as the piston rises towards TDC, but the capsule is actuated again, and the BRAKE VALVE profile is applied to the valve 18 to brake the engine in a compression release manner. If the capsule is actuated for the whole cycle, piston contact could occur, as shown in the CAM line. So, the capsule is deactivated for the exhaust valve lift profile to return to the normal exhaust valve lift profile. The valve bridge 10 acted on by the center rocker arm (FIG. 4A) can supply the normal exhaust valve lift profile, while special control of the right hand (first auxiliary) capsule (FIG. 4B) can supply the special engine brake profiles.

With the teachings herein provided it is possible to configure a valvetrain wherein the first auxiliary capsule is configured to provide in the first auxiliary active state an engine braking function or an exhaust reinduction function as the first auxiliary valve actuation profile to a first valve connected to the first valve mounting area.

Also, the first valve actuation profile can comprise one of a late intake valve closing profile or an early exhaust valve opening profile relative to the second valve actuation profile.

A valvetrain according to the teachings can comprise the center capsule configured to provide in the lost motion state a cylinder deactivation function to the valve bridge so as to eliminate motion of the valve bridge. The first auxiliary capsule can be configured to provide in the first auxiliary active state an engine braking function or an exhaust reinduction function as the first auxiliary valve actuation profile to a first valve connected to the first valve mounting area. The second auxiliary capsule can be configured to provide in the second auxiliary active state an engine braking function or an exhaust reinduction function as the second auxiliary valve actuation profile to a second valve connected to the second valve mounting area.

Figure 9:
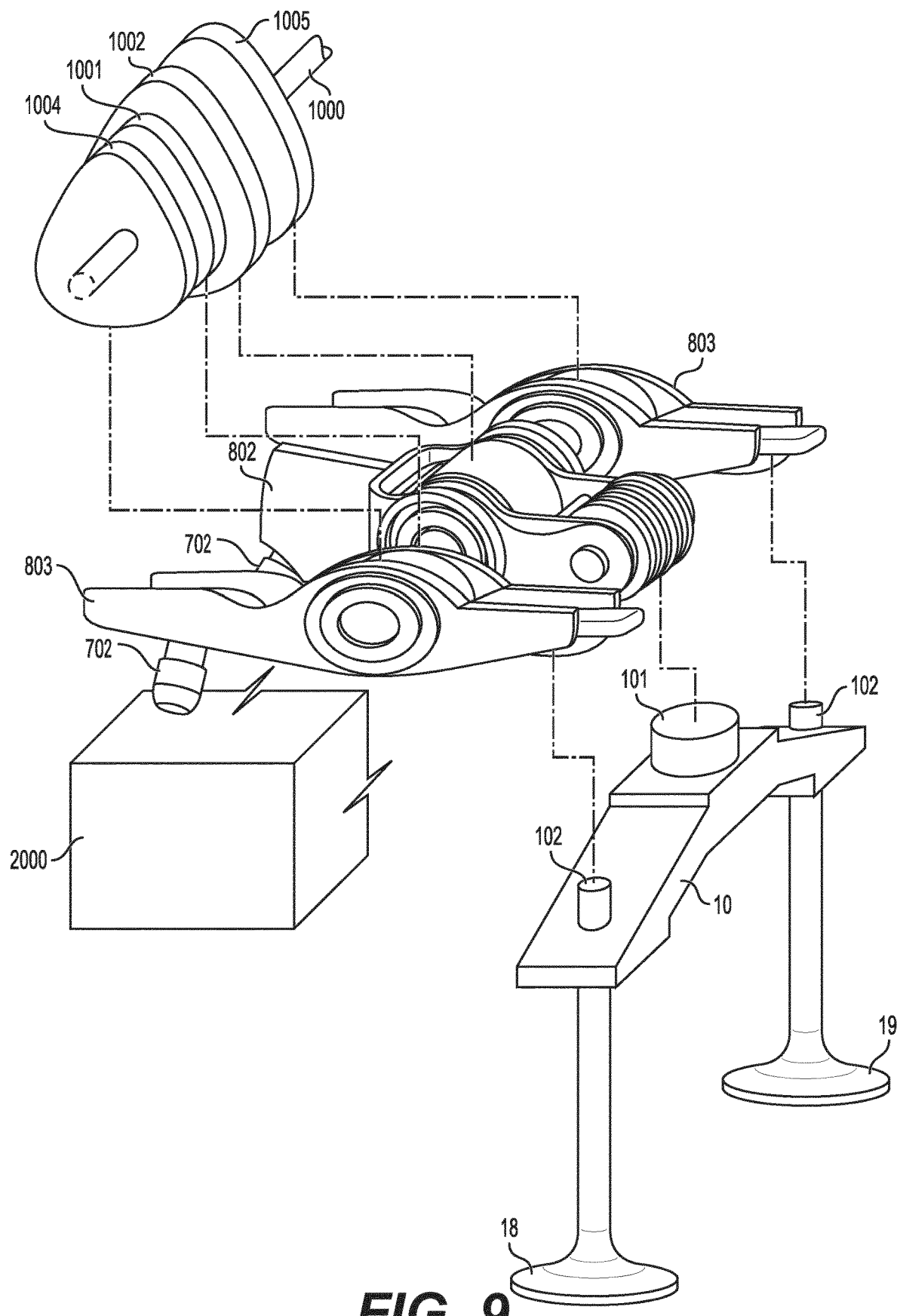
FIG. 9 is an exploded view of a valvetrain system comprising a switching rocker arm and two auxiliary rocker arms.

When considering the teachings of FIG. 9, a valvetrain can be configured so that the first valve actuation profile comprises one of a late intake valve closing profile or an early exhaust valve opening profile relative to the second valve actuation profile.

Figure 8:
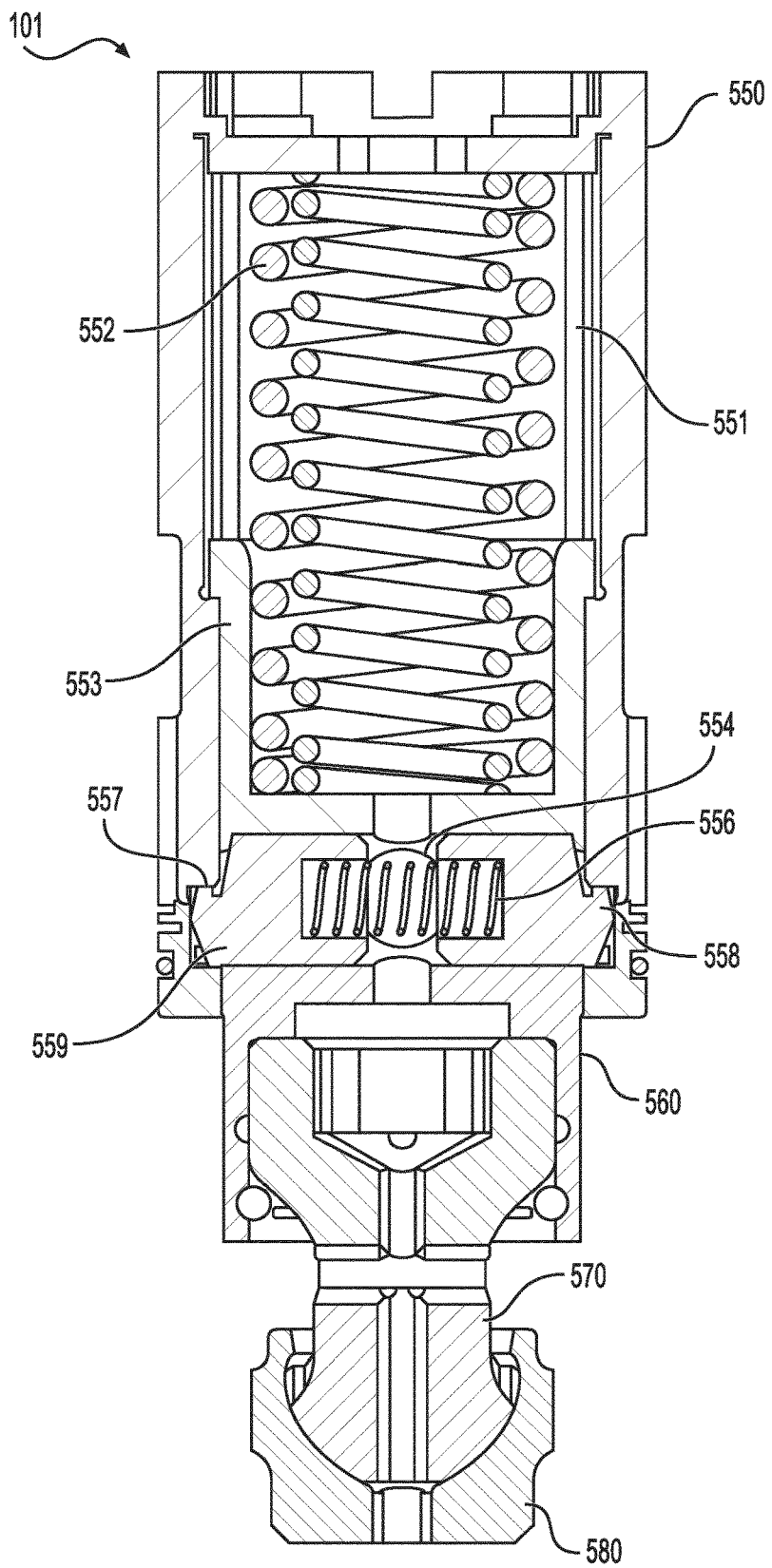
FIG. 8 shows an example of a valve side center or auxiliary capsule in the form of a deactivating capsule.
Figures 10A, 10B:
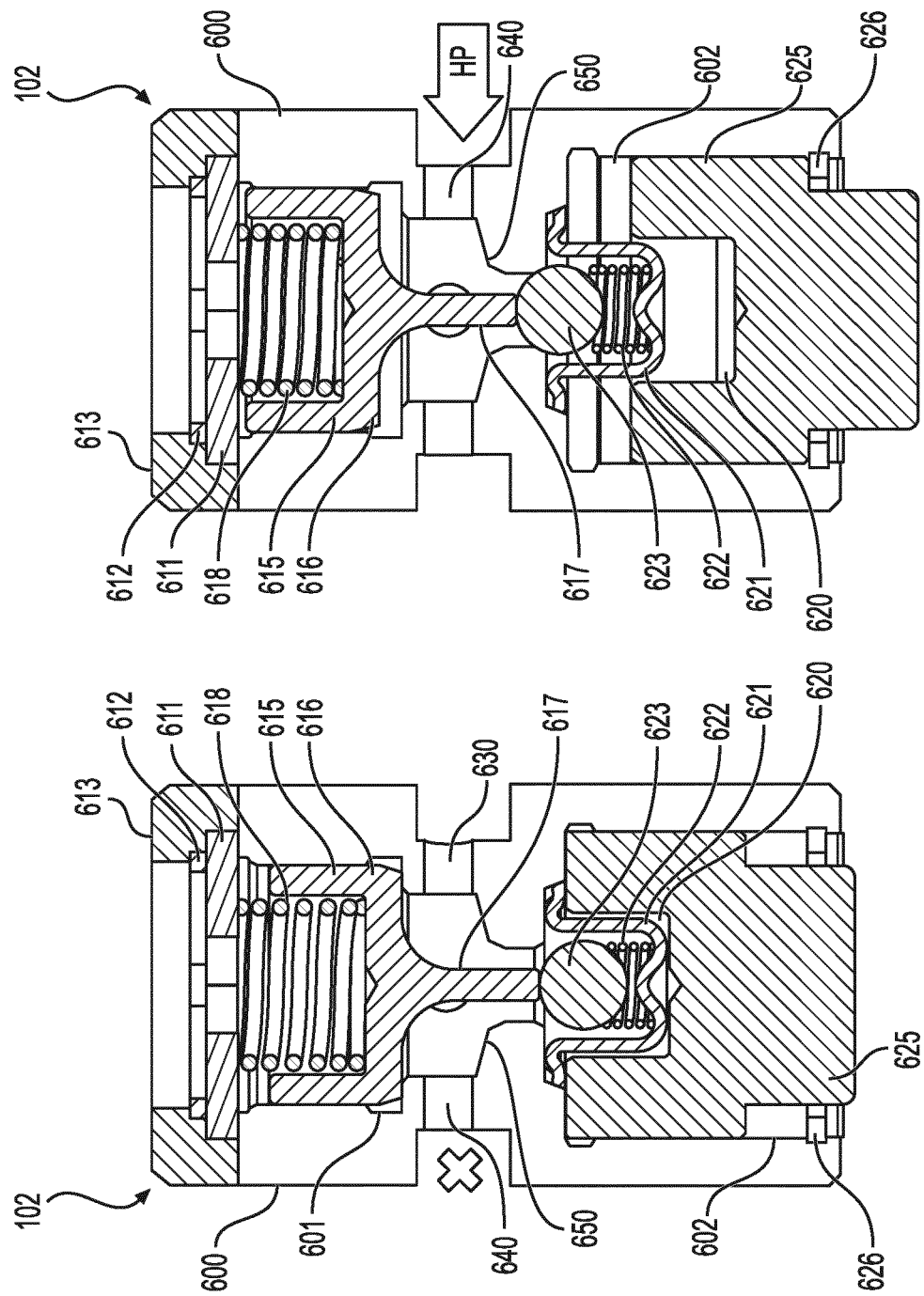
FIGS. 10A and 10B show center or auxiliary capsules in the form of an added motion capsule.

FIG. 9 shows an additional aspect, where a manual lash adjusting capsule 702 is provided at the pivot. The capsules 101 on the valve end of the switchable rocker arm and the capsules 102 on the valve ends of the auxiliary rocker arms can have alternative forms, as examples of capsules compatible with the teachings herein. FIGS. 8, 10A, & 10B show examples of these alternative capsules.

Lost motion capsule 101 can comprise an outer housing 550. A lost motion chamber 551 in the outer housing 550 can house one or more lost motion springs 552. A movable cup 553 can be sized and rimmed to limit the collapse and expansion of the lost motion springs 552. A movable latch mechanism is shown to comprise a pair of latches 559 having ledges 558 to catch on grooves 557 in inner side of outer housing 550. A latch spring 556 biases the latches 559 to the latched position. An oil feed 554 can cause the latches 559 to collapse. When the latches 559 collapse, then body 560 can move up into the outer housing 550 and collapse the lost motion springs 552 when the overhead cam lobe 1001 or 1002 acts on the affiliated rocker arm 802. A stem 570 and elephant foot 580 is connected to the body 560 as an example of an abutment for center point 13.

Alternative pintle capsules 102 can be added motion capsules depending upon fluid pressure supplied thereto. A switchable capsule 102 comprises a movable element 625 that can reciprocate in a cylinder 602. The movable element 625 is switchable between an extended position in FIG. 10B and a collapsed position in FIG. 10A. Switching is controlled by hydraulic pressure HP and thus the switchable capsule constitutes a deactivatable hydraulic device. No hydraulic pressure HP is applied in FIG. 10A, as indicated by the X, so the movable element 625 can be a plunger collapsed in a cylinder 602 within body 600. Plunger can be stepped and secured within cylinder 602 by a snap ring 626 or the like. A fluid control device comprising a ball 623 in a cage 621 can be seated in a plunger cup 620 in the cylinder 602. An upper cylinder 601 can house a cup 616 of a pintle 615. Pintle 615 can be biased by a pintle spring 618 biased against a disc 611. Disc can be secured by such as another snap ring 612 and cap 613. Disc 611 can be adjustable. Without hydraulic pressure HP, the pin 617 of pintle 615 pushes ball 623 away from a shoulder in the body 600. But when hydraulic pressure is applied, the pintle 615 rises in the upper cylinder 601, the ball 623 can be pushed by spring 622 against shoulder, and hydraulic fluid can be captured in plunger cup 620. The hydraulic fluid can be supplied through cross drilled ports 630, 640 into chamber 650, and then the hydraulic fluid can fill plunger cup 620 and extend the plunger (movable element 625) until the ball 623 reaches the shoulder. The trapped hydraulic pressure permits auxiliary valve actuation while the hydraulic pressure HP is applied. The hydraulic pressure HP can be supplied through hydraulic ports in the auxiliary rocker arms 803 or through a tower or the cylinder block.

Figure 7:
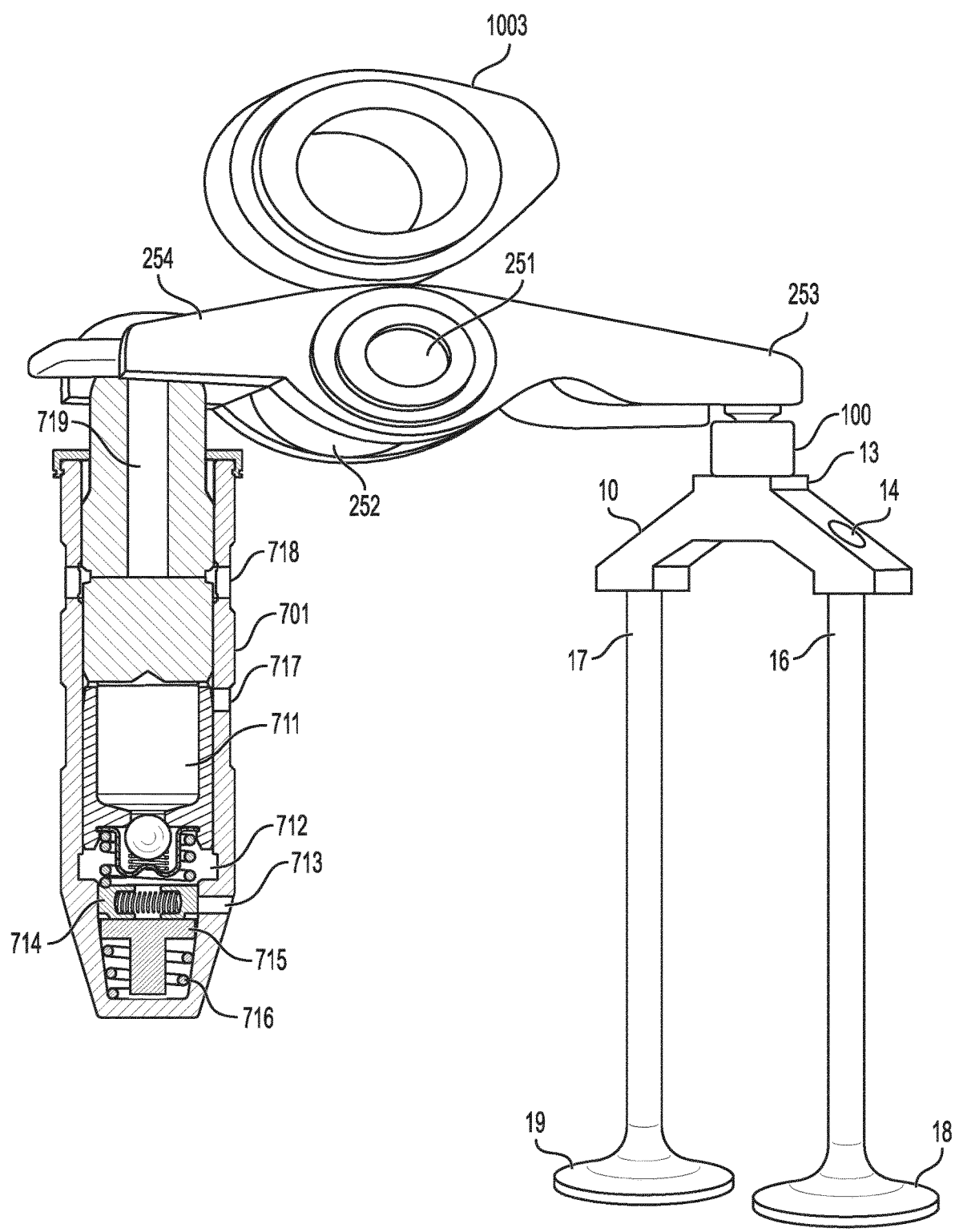
FIG. 7 shows an example of a center capsule in the form of a deactivating lash adjuster.

While a basic lash adjuster is shown in FIG. 9, it is possible to substitute a hydraulic deactivating lash adjuster 701 for one or more of the manual lash adjusting capsules 702. An example of a deactivating lash adjuster 701 is shown in FIG. 7. An internal hydraulic port 719 to feed the rocker arm can be fed by an opening 718. This opening can provide additional fluid control to the lash adjustment aspects, as can oil feed opening 717. Low pressure chamber 711 and high pressure chamber 712 can be controlled as customary to provide valve lash adjustment. Then, the capability to switch between active state and lost motion state can be added via latch assembly 714 similar to movable latch mechanism of FIG. 8. With the latches extended, active state is enabled and valve actuation profiles are transferred. With the latches collapsed, the rocker arm 803 can push the internals of the lash adjuster to move stand 715 and collapse lost motion spring 716. A control opening 713 can be provided to select whether the pair of latches are collapsed.

Other implementations will be apparent to those skilled in the art from consideration of the specification and practice of the examples disclosed herein.

What is claimed is:

1. A valvetrain for a type II engine, the valvetrain comprising:
   a valve bridge comprising a center point, a first valve mounting area, and a second valve mounting area;
   a switching rocker arm including a valve end and a pivot end, the switching rocker arm configured to switch between:
      a first configuration in which the switching rocker arm transfers a first valve actuation profile from a first overhead cam lobe to the center point; and
      a second configuration in which the switching rocker arm transfers a second valve actuation profile from a second overhead cam lobe to the center point;
   a center capsule connected to the valve end or to the pivot end, the center capsule configured to switch between:
      an active state in which the transfer of a selected valve actuation profile of the first valve actuation profile and the second valve actuation profile is enabled; and
      a lost motion state in which the selected valve actuation profile is absorbed;
   a first auxiliary rocker arm including a first auxiliary valve end and a first auxiliary pivot end, the first auxiliary rocker arm configured to transfer a first auxiliary valve actuation profile from a third overhead cam lobe to the first valve mounting area;
   a first auxiliary capsule connected to the first auxiliary valve end or the second auxiliary pivot end, the first auxiliary capsule configured to switch between:

a first auxiliary active state in which the transfer of the first auxiliary valve actuation profile is enabled; and a first auxiliary lost motion state in which the first auxiliary valve actuation profile is absorbed;

a second auxiliary rocker arm including a second auxiliary valve end and a second auxiliary pivot end, the second auxiliary rocker arm configured to transfer a second auxiliary valve actuation profile from a fourth overhead cam lobe to the second valve mounting area; and a second auxiliary capsule connected to the second auxiliary valve end or the second auxiliary pivot end, the second auxiliary capsule configured to switch between:

a second auxiliary active state in which the transfer of the second auxiliary valve actuation profile is enabled; and a second auxiliary lost motion state in which the second auxiliary valve actuation profile is absorbed.

2. The valvetrain of claim 1, wherein the first valve mounting area comprises a first pass-through.

3. The valvetrain of claim 2, wherein the second valve mounting area comprises a second pass-through.

4. The valvetrain of claim 1, wherein the center capsule comprises a hydraulic lash adjuster.

5. The valvetrain of claim 1, wherein the center capsule is connected to the valve end and wherein the pivot end comprises a hydraulic lash adjuster.

6. The valvetrain of claim 1, wherein the first auxiliary capsule comprises a first auxiliary hydraulic lash adjuster.

7. The valvetrain of claim 1, wherein the first auxiliary capsule is connected to the first auxiliary valve end and wherein the first auxiliary pivot end comprises a first auxiliary hydraulic lash adjuster.

8. The valvetrain of claim 1 wherein the second auxiliary capsule comprises a second auxiliary hydraulic lash adjuster.

9. The valvetrain of claim 1, wherein the second auxiliary capsule is connected to the second auxiliary valve end and wherein the second auxiliary pivot end comprises a second auxiliary hydraulic lash adjuster.

10. The valvetrain of claim 1, wherein, in the lost motion state, the center capsule is configured to provide a cylinder deactivation function so as to eliminate motion of the valve bridge.

11. The valvetrain of claim 1, wherein the first auxiliary valve actuation profile is configured to provide an engine braking function or an exhaust reinduction function to a first valve connected to the first valve mounting area.

12. The valvetrain of claim 1, wherein the first valve actuation profile comprises one of a late intake valve closing profile or an early exhaust valve opening profile.

13. The valvetrain of claim 1, wherein:

in the lost motion state, the center capsule is configured to provide a cylinder deactivation function so as to eliminate motion of the valve bridge;

the first auxiliary valve actuation profile is configured to provide an engine braking function or an exhaust reinduction function to a first valve connected to the first valve mounting area; and the second auxiliary valve actuation profile is configured to provide an engine braking function or an exhaust reinduction function to a second valve connected to the second valve mounting area.

14. The valvetrain of claim 13, wherein the first valve actuation profile comprises one of a late intake valve closing profile or an early exhaust valve opening profile.

\* \* \* \* \*